No. 616,937. Patented Jan. 3, 1899.
F. M. KING & P. W. EGAN.
CONE AND BALL BEARING.
(Application filed June 6, 1898.)
(No Model.)
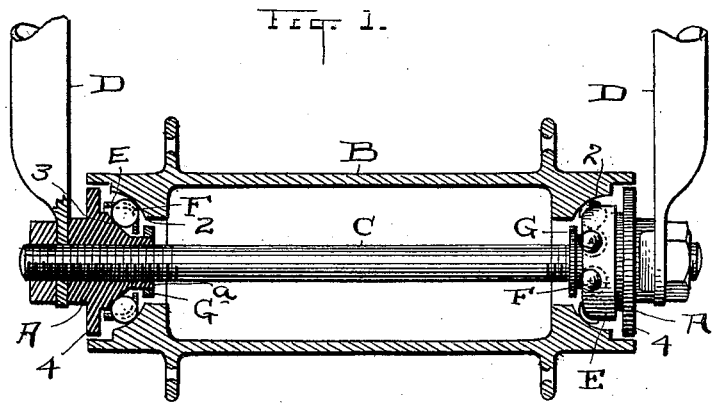
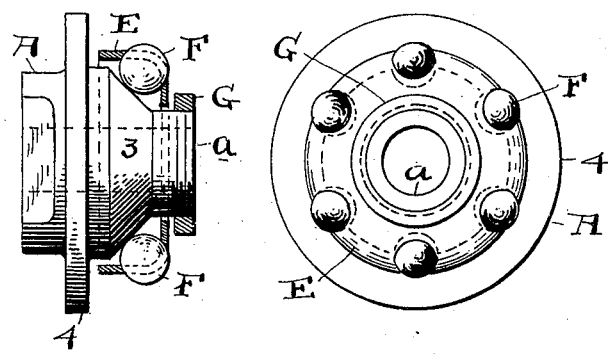
ATTEST
R. B. Moser
N. E. Mudra
INVENTORS.
Frank M. King
Patrick W. Egan
By N. F. Fisher ATTY

UNITED STATES PATENT OFFICE.

FRANK M. KING AND PATRICK W. EGAN, OF CLEVELAND, OHIO.

CONE AND BALL-BEARING.

SPECIFICATION forming part of Letters Patent No. 616,937, dated January 3, 1899.

Application filed June 6, 1898. Serial No. 682,688. (No model.)

*To all whom it may concern:*

Be it known that we, FRANK M. KING and PATRICK W. EGAN, citizens of the United States, residing at Cleveland, in the county of Cuyahoga and State of Ohio, have invented certain new and useful Improvements in Cones and Ball-Bearings; and we do declare that the following is a full, clear, and exact description of the invention, which will enable others skilled in the art to which it appertains to make and use the same.

Our invention relates to a combined cone and ball-bearing adapted especially to bicycle, tricycle, and like wheels wherein the cones are separate and removable parts.

Various forms and styles of ball-separators and ball-retainers have been made and used, and we are personally familiar with many such devices, some of which serve both as separators and retainers; but our invention is not alone a separator and retainer, but consists also in the combination therewith of a cone on which the balls and retainer are confined and with which they constitute a new article of manufacture and sale. We are not, therefore, aware that any one ever before made or used a combined article of this kind adapted to be sold and handled as an entirety and whereon or wherein the balls are held permanently and securely at all times unless the parts are purposely separated for cleansing or possibly to remove a cracked or defective ball. To these ends the cone and retainer are constructed and arranged and combined substantially as shown and described, and particularly pointed out in the claim.

In the accompanying drawings, Figure 1 is a longitudinal sectional elevation of what may be regarded as the hub of a bicycle-wheel having the invention in working position at each end. Fig. 2 is a side elevation of the invention constituting our new article of manufacture and showing the cone entire and the ball-retainer and the confining-nut in cross-section. Fig. 3 is a front elevation of the article shown in Fig. 2 with all the parts complete.

Having reference now to the combined article as seen in Figs. 2 and 3, A represents the cone, adapted to be employed in any of the well-known styles of wheel wherein conical bearings are employed and of which an example is given in Fig. 1. In this latter view, B represents the hub proper of a wheel cylindrical in outer contour and having in each end a beveled bearing portion 2, which comes opposite the corresponding bearing-surface 3 of the cone A, and a single cone A is shown at each end of said hub. The cones are open through their center diametrically and adapted to receive the carrying and connecting shaft or axle C. This shaft is threaded at both ends to receive the said cones as well as to secure the frame-standards D thereon, and each cone has a lateral flange 4, which comes within the hub B and closes the same as completely as practicable in order to exclude dust and keep the bearings clean. Different constructions characterize different wheels; but in any event they all have means to protect the bearings from outside exposure. All such means, however, are more or less insufficient and defective, and in spite of all precautions and preventives it occurs that ball-bearings in wheels of this kind get foul and clogged and require frequent cleaning, especially where dusty riding is indulged in. Facility for getting at the bearings when cleaning is to be done is therefore of material importance, and so, also, is the retention of the balls when the parts are separated for cleaning. In our construction a certain separation can be made and yet keep the elements constituting our combined article together. These parts are the cone A, the retaining-cup E, the balls F, and the confining nut or washer G. All these parts are put together before placing them in the wheel, and they always are removed together. To accomplish this union, the cone A is formed with a cylindrical neck a, over which the ball-retaining cup is sleeved, and the said cup is secured removably in place by the nut G, threaded onto said neck. The cup E is formed with holes for the balls F in the angle of its bend, and in which holes the balls have a free movement, but are confined from escape. Hence the cone and balls are removed together, and the construction is such that the device can be taken apart and placed together again by any unskilled person and with no need of losing any of the balls. In all other bearings known to us the balls and their retainers are separate from the cone by reason of removal of the cone from the wheel or place of operation, but not so in this case.

Here the balls go necessarily with the cones, and the construction of the cone is such as to confine both the balls and the retainer thereon.

If preferred, some other way than threading may be employed to secure the part G on the neck of the cone; but some sufficient means should be used which will allow the removal of said part when occasion requires.

What we claim is—

As a new article of manufacture, an antifriction-bearing for vehicle-wheels, comprising a cone with an annular inwardly-projecting neck, a series of antifriction-balls and a ball-retainer about said cone loose on said neck and having a series of holes through which the balls are exposed, and means on said neck to confine the ball-retainer and balls on the cone, whereby the cone and its balls may be removed and kept together when the bearing is detached, substantially as described.

Witness our hands to the foregoing specification this 25th day of May, 1898.

FRANK M. KING.
PATRICK W. EGAN.

Witnesses:
H. E. MUDRA,
R. B. MOSER.